(12) United States Patent
Bliss et al.

(10) Patent No.: US 9,199,795 B2
(45) Date of Patent: Dec. 1, 2015

(54) APPARATUS AND METHOD OF EGG TRANSFER WITHIN AN EGG HANDLING MACHINE

(71) Applicant: Sanovo Technology Group, Plymouth, MI (US)

(72) Inventors: George N. Bliss, Birmingham, MI (US); Keith H Pietila, Livonia, MI (US)

(73) Assignee: Sanovo Technology Group, Plymouth, MI (US)

( * ) Notice: Subject to any disclaimer, the term of this patent is extended or adjusted under 35 U.S.C. 154(b) by 0 days.

(21) Appl. No.: 14/106,026

(22) Filed: Dec. 13, 2013

(65) Prior Publication Data

US 2014/0166435 A1    Jun. 19, 2014

Related U.S. Application Data

(63) Continuation of application No. 13/715,362, filed on Dec. 14, 2012, now Pat. No. 8,607,960.

(51) Int. Cl.
| | | |
|---|---|---|
| *B65G 47/22* | (2006.01) | |
| *B65G 17/00* | (2006.01) | |
| *B65B 23/08* | (2006.01) | |
| *B65G 47/244* | (2006.01) | |
| *B65B 35/58* | (2006.01) | |

(52) U.S. Cl.
CPC .............. *B65G 17/005* (2013.01); *B65B 23/08* (2013.01); *B65B 35/58* (2013.01); *B65G 47/244* (2013.01); *B65G 2201/0208* (2013.01)

(58) Field of Classification Search
USPC ........... 198/377.03, 469.1, 470.1, 474.1, 793, 198/803.4, 803.9
See application file for complete search history.

(56) References Cited

U.S. PATENT DOCUMENTS

| | | | | |
|---|---|---|---|---|
| 3,985,223 | A * | 10/1976 | Forcella et al. | 198/377.03 |
| 4,068,882 | A * | 1/1978 | van der Schoot | 294/116 |
| 4,462,201 | A * | 7/1984 | Nambu | 53/475 |
| 4,488,637 | A * | 12/1984 | Loeffler | 198/803.9 |
| 4,522,293 | A * | 6/1985 | van Kattenbroek | 198/377.03 |
| 5,101,954 | A * | 4/1992 | Nambu | 198/370.04 |
| 5,160,019 | A * | 11/1992 | Temming | 198/803.9 |
| 5,176,243 | A * | 1/1993 | Temming et al. | 198/400 |
| 5,749,453 | A * | 5/1998 | Doornekamp et al. | 198/400 |
| 6,446,784 | B1 * | 9/2002 | Veldhuizen et al. | 198/399 |
| 6,625,960 | B1 * | 9/2003 | Nambu | 53/502 |
| 7,926,664 | B2 * | 4/2011 | De Vlaam | 209/513 |
| 7,946,413 | B2 * | 5/2011 | Hordijk et al. | 198/400 |
| 8,387,775 | B2 * | 3/2013 | Mckeown et al. | 198/485.1 |
| 8,607,960 | B1 * | 12/2013 | Bliss et al. | 198/394 |

* cited by examiner

*Primary Examiner* — Douglas Hess
(74) *Attorney, Agent, or Firm* — Burgess Law Office, PLLC

(57) ABSTRACT

An egg carrier including a gripper mechanism wherein the egg carrier is operative to grip and release an egg at a predetermined orientation. Accordingly, the egg carrier includes a mechanism whereby the gripper mechanism can be rotated whereby an egg can be released at an angle greater or less than 90°. The gripper mechanism capable of gripping an egg in one orientation and then pivoting or changing the orientation of the egg such that the egg is released at a predetermined angle.

20 Claims, 8 Drawing Sheets

APPARATUS AND METHOD OF EGG TRANSFER WITHIN AN EGG HANDLING MACHINE

FIELD OF THE INVENTION

The present disclosure relates generally to an apparatus and method of egg transfer within an egg handling machine, and in particular to an improved apparatus and method for transferring eggs within the egg handling machine in which eggs may be loaded, handled, and subsequently packaged.

BACKGROUND

Various types of machines are available for handling and packaging eggs, with each step of the process occurring within a particular station. Each station accomplishes a particular task including but not limited to washing, drying, weighing, sorting and packing of the eggs. Often, each station may accomplish a plurality of tasks. The varied number of stations encountered requires transportation of the egg through multiple stations to final packaging, and frequently at high rates of speed. The stations may be modular, so that the machine can be reconfigured to satisfy a particular processing need.

Depending on the space configurations of the manufacturing environment, the stations may be arranged in a straight line, or may have an angular relationship, such as "L" shaped, or "U" shaped or the like. During transportation of the eggs through each of the stations by a conveying mechanism, the eggs may travel in a random manner, or in an organized manner, such as in lanes. The eggs may have a predetermined orientation with respect to a major axis of the egg, i.e. smaller more pointed end first, or larger more rounded end first. An example of a conveying mechanism is an in-feed roller conveyor. Another example of a conveying mechanism is an overhead carriage assembly and egg gripper or holder. The holder may grip the egg with a predetermined orientation, such as horizontally or vertically. Further, in handling eggs, the ability to handle a high volume of eggs in a brief time is an important capability.

While existing egg handling machines work well, improving specific features associated with transport of the eggs will enhance overall line speed. For example, the eggs may be initially fed into the machine without the same orientation, and at some point in the process the orientation of the egg will need to be sensed and the eggs uniformly arranged. Further, during transport of the eggs between stations, the type of conveyor may change, such as from an overhead gripper to a series of rotating brushes, cup, basket or the like. For example, the rotating brushes may facilitate the transfer of the egg into another type of conveying mechanism. In a high-speed environment, such changes may slow down the overall process.

In another example of an existing feature of an egg handling machine, the cups used to transport the eggs have a clamshell shape and pivot about a pivot axis located above the centerline of the egg. While the present cups work, the overall line speed is reduced due to the opening and closing of the cups while receiving and removing the egg.

In yet another example, of an existing feature of an egg handling machine, the eggs are either oriented tip up or tip down, and are released at a 90 degree angle from an overhead conveyer onto another conveying mechanism. While the presently used release angle works, the line speed of the machine may not be optimized due to the trajectory of the egg.

Thus, there is a need for an improved apparatus and method for efficiently and rapidly conveying eggs through multiple processing stations and facilitating the rapid transition of the eggs through the multiple processing stations, within an egg handling machine.

SUMMARY OF THE DISCLOSURE

Accordingly, the present disclosure relates to an improved egg orientation mechanism for orienting eggs within a machine for handling eggs. The egg orientation mechanism includes a plurality of eggs positioned randomly on a first egg conveying mechanism. A lifter mechanism may be located adjacent the first egg conveying mechanism, wherein the lifter mechanism raises a portion of each egg away from the first egg conveying mechanism to off balance the egg. The egg orientation mechanism may also include a sidewall adjacent the first egg conveying mechanism, and an end of the off balance egg contacts the sidewall to rotate the egg and to orient the egg with the larger end of the egg leading as the egg is released from the first egg conveying mechanism into a second egg conveying mechanism positioned below the first egg conveying mechanism.

The present disclosure also relates to a clamshell egg holder for transporting eggs in a machine for handling eggs having a front wall with an upper end and a lower end, wherein the front wall has a predetermined height. The clamshell holder also has a rear wall with an upper end and a lower end, wherein the rear wall has a predetermined height. An egg receiving space is formed between the front wall and the rear wall, and either one of the front wall or rear wall is pivotal about a pivot point that is located below a centerline of the egg receiving space to increase the egg receiving space when catching the egg and decreasing the egg receiving space when holding the egg.

The present disclosure further relates to a method of releasing an egg from an egg carrying mechanism in a machine for handling eggs, the method includes the steps of holding an egg using an egg holder, wherein the egg has a first predetermined orientation of 90 degrees with respect to a frame supporting the egg carrier mechanism. The method further includes the step of rotating the egg carrying mechanism so that the egg has a second predetermined orientation with respect to the frame, and releasing the egg at an angle that is either greater than 90 degrees or less than 90 degrees with respect to the frame.

Advantageously, an apparatus and method of egg handling is disclosed for transporting eggs within a high-speed machine. An advantage of the present disclosure is that the eggs are oriented quickly by taking advantage of the natural characteristics of the eggs without requiring additional inspection for proper orientation. Another advantage is that all the eggs are rotated so that the narrower or tip end is up and the larger, more rounded end downward in a rapid paced mechanical process, thus assuring proper orientation. Still another advantage of the present disclosure is that by orienting the eggs so that the larger end impacts the conveying mechanism first, the egg will not skid or rotate upon landing. A further advantage of the present disclosure is that a clamshell egg holder is provided having a pivot point that is below the centerline of the egg receiving portion of the egg holder to facilitate higher speed transfers to occur more safely to the egg carrier. Still a further advantage of the present disclosure is that a direct carrier-to-carrier transfer may be made, thus eliminating an intermediate transfer mechanism, such as a cup to brush transfer. Yet a further advantage of the present disclosure is that the eggs may be released from an overhead conveying mechanism into a flatbed conveying mechanism or receiver at a predetermined angle other than 90 degrees to optimize trajectory of egg. Yet still a further advantage of the present disclosure is in the ability to maximize line speeds of the egg handling machine.

Other features and advantages of the present disclosure will become readily appreciated based upon the following description when considered in conjunction with the accompanying drawings.

DESCRIPTION OF THE DRAWINGS

FIG. 3a is another perspective view of the egg orientation mechanism for use with the egg handling machine of FIG. 1.

FIG. 3b is a detailed view of the egg orientation mechanism of FIG. 3a.

DESCRIPTION

Figure 1:
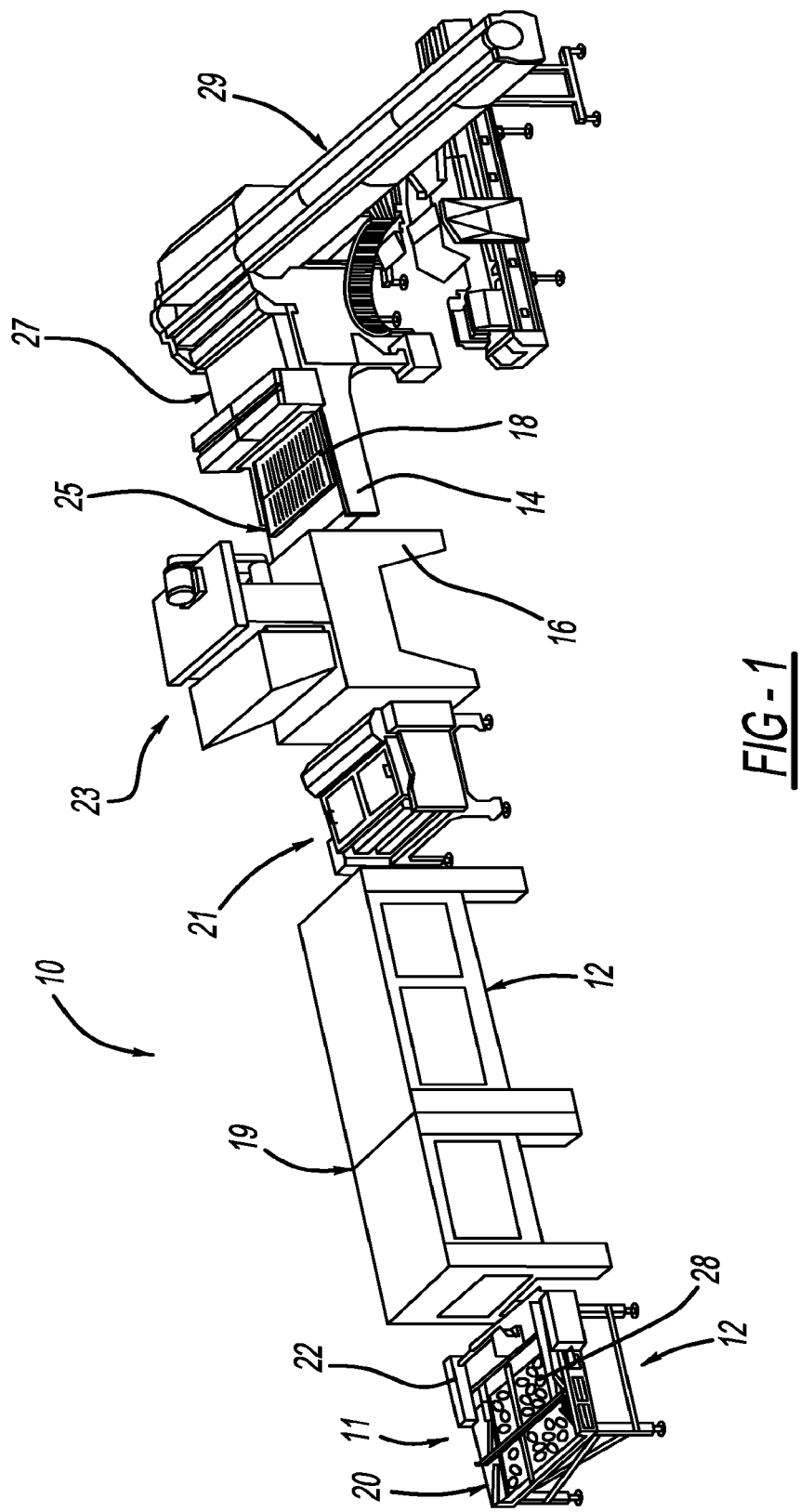
FIG. 1 is a perspective view of an egg handling machine according to the present disclosure.

FIG. 1 illustrates an egg handling machine 10 used to handle eggs. The egg handling machine 10 may include various stations 11, and within each station 11 one or more actions may be performed. Examples of stations 11 may include an input or loading station, an accumulator, a washing station, a leak detection station, a dirt detection station, a grading station, a crack detection station, a blood detection station, or an output packaging station, to be described. Other examples relating to processing stations include a breaking and separation station, pasteurization station, drying station, deshelling station, or the like. Further types of stations 11 are contemplated depending on the particular need for the eggs 28. Advantageously, the individual stations are modular, and the use of a station or order of the stations 11 can be varied depending on the particular need. The egg handling machine 10 depicted in FIG. 1 is by way of example and not of limitation, and could utilize more, less or different stations.

In the illustrated example of an egg handling machine, the eggs 28 may be initially placed into the egg handling machine 10 at a loading station 20 with a random orientation of the egg, i.e. orientation of major axis 42 of egg (to be described). The loading station 20 may include an accumulator 22 to orient the eggs 28 into a predetermined number of rows, such as 18. Various types of accumulators 22 may be utilized, such as dividers or walls, or rollers, or brushes or the like. Eggs 28 travel via a conveying mechanism 18 (to be described) to the next processing station, which in this example is a washing station 19, and the eggs are washed. The eggs may then be transported to the next station, which in this example is a detection station 21, such as a leak or crack detection station. For example, in a leak detection station the eggs are examined for the presence of a leak using a leak detection mechanism as is understood in the art. If a leak in the egg is detected, it may be discarded. The eggs 28 may be then moved through a drying station 23, and dried. The eggs 28 may then be moved to another detection station, such as a dirt detection station 25, and a presence of dirt on the egg is detected using a dirt detection mechanism as is understood in the art. The eggs 28 may also be moved through a grading station 27, in which each egg may be examined (such as by weighing or the like) and assigned a particular grade. Finally, the eggs may be moved through an output station 29 and prepared for removal from the machine 10. An example of an output station 29 is a packaging station, which may facilitate the final packing of the egg into cartons. It should be appreciated that several operations may be combined to occur within one station.

Figure 2:
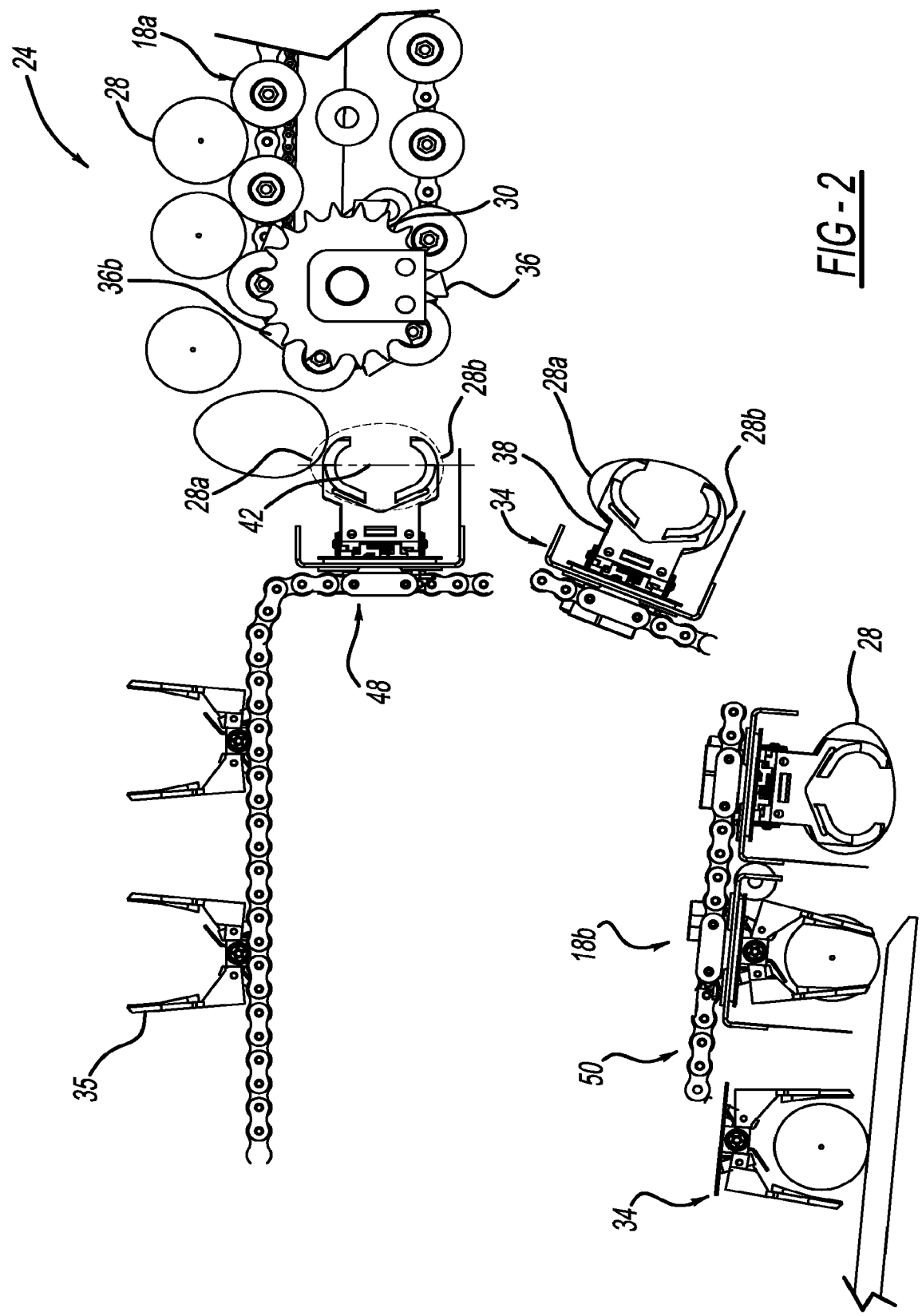
FIG. 2 is a perspective view of an egg orientation mechanism for use with the egg handling machine of FIG. 1.
Figure 3:
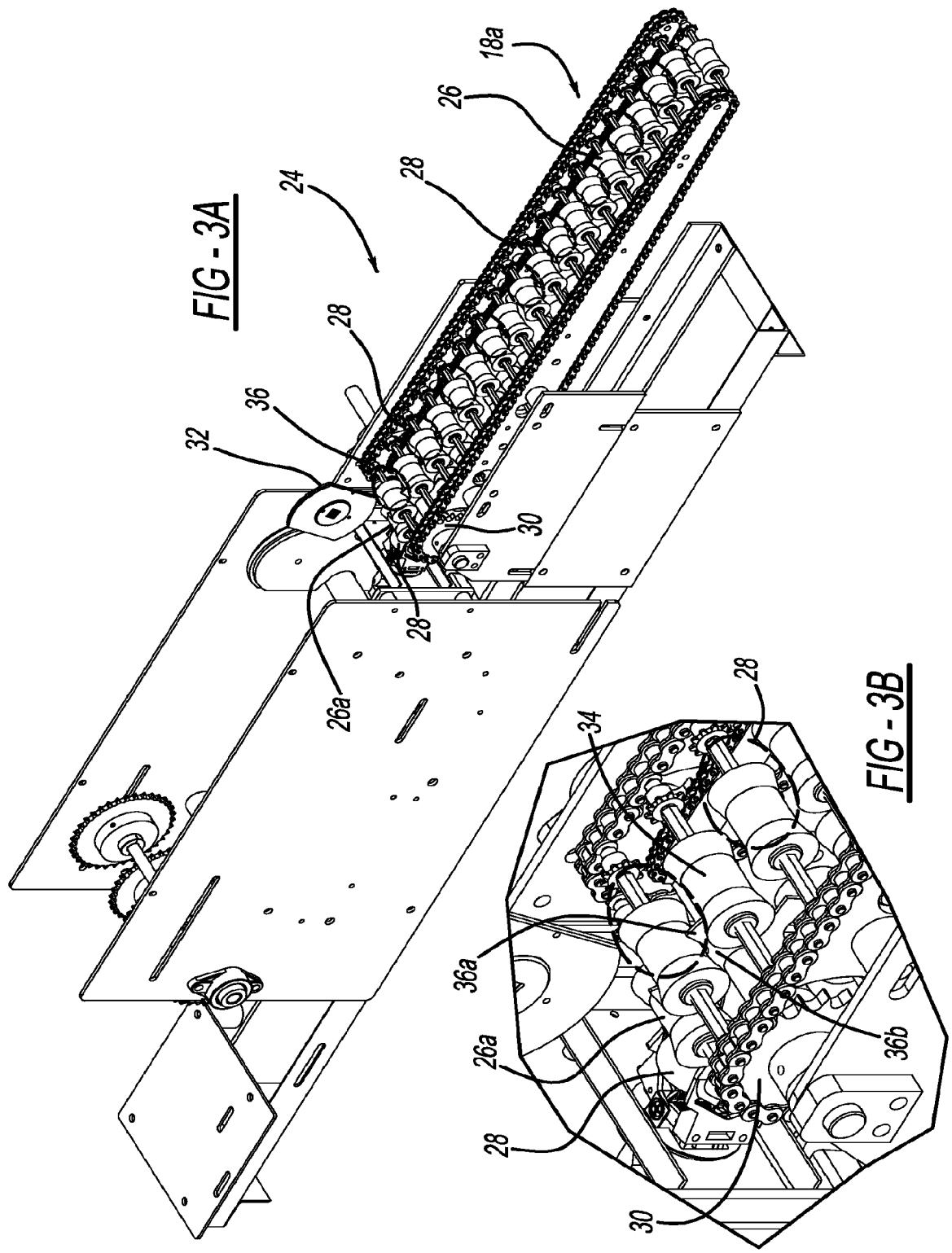

While each station 11 performs different functions, each station 11 has similar features. That is, each station 11 of the egg handling machine 10 of this example generally includes a frame 12. Depending on the type of station and function occurring within, the frame 12 may generally have a planar table top 14 and supports or legs 16 that support the table top 14, although other frame configurations are contemplated. A conveying mechanism generally shown at 18 is supported by the frame 12, and moves the eggs through and between the previously described stations 11. Various types of conveying mechanisms 18 are contemplated, such as an endless conveyor or feeder assembly having associated egg carrier mechanisms 34 i.e. brushes, rotatable rollers, grippers, carriers or the like for moving or holding the eggs. The type of conveying mechanism 18 is non-limiting and may be selectively determined according to the task occurring at a particular station. In an example as shown in FIGS. 2 and 3, a first conveying mechanism 18a includes rollers 26, each roller extends parallel to and spaced apart from another roller. Rotation of the rollers 26 is via respective pinions which mesh with racks located alongside rollers. Racks and pinions may serve to automatically rotate the rollers 26 as the eggs 28 move along an endless path, such as by a chain and drive element. A second conveying mechanism 18b receives the eggs from the first conveying mechanism in a manner to be described. The conveying mechanism 18 includes other features that are not shown but understood, such as motors, servos, belts, or the like to facilitate the operation of the conveying mechanism 18.

Referring back to FIGS. 2-3b, an egg orientation mechanism 24 used to orient all of the eggs 28 in a predetermined manner is illustrated. In this example, the egg orientation mechanism 24 is positioned at the end of the loading station 19, although it can be positioned within any station whereby a predetermined orientation of the egg is desirable, i.e. grading or output or the like. By way of reference, the egg 28 has a major axis 42 extending longitudinally through the egg from a tip or narrower end of the egg as shown at 28a to a larger, more rounded end of the egg as shown at 28b.

The egg orientation mechanism 24 may include a rotatable sprocket wheel 30 that is secured to the final set of rollers 26a of the first conveying mechanism 18a of this example to facilitate rotation of the conveying mechanism. The egg orientation mechanism 24 may also include a lifter mechanism 36 that raises the egg. For example, the lifter mechanism 36 may be a pivotal member positioned on the rollers 26 so that it is located beneath the egg 28. In this example, the lifter mechanism 36 is located on the final set of rollers 26a before the egg falls off. The lifter mechanism 36 of this example includes a body portion 36a and a plurality of fingers 36b projecting from the body portion 36a. The body portion 36a is generally circular, and includes a central aperture for mounting the lifter mechanism 36 to the roller, and the finger 36b is rectangular. Other configurations are contemplated. As the egg 28 moves along the rollers 26, the lifter mechanism 36 is rotating about the roller 26, such that the finger 36a contacts the egg 28 and lifts the end of the egg 28 off the roller 26 as the traveling egg crosses the lifter mechanism. Since the tip 28a of the egg is by nature driven sideways or outwardly as the egg 28 travels along the rollers 26, the lifting motion of the egg 28 initially throws the egg 28 off balance.

The egg orientation mechanism 24 also includes a sidewall 32 positioned adjacent the rollers 26. In this example the sidewall 32 is a rigid material that is fixedly attached and adjacent to the last roller 26a, although other configurations are contemplated. The sidewall 18 is located so that the egg can contact the sidewall 18 either as it is lifted up or when falling off the last roller 26a to create a "drag" effect. Further, the last roller 26a may be rotated in a direction that is opposite of the earlier rollers 26 to further induce the rotation of the egg. Thus, the egg tip 28a will make contact with the stationary sidewall 32 before falling off the rollers 26. The contact between the egg tip 28a and sidewall 32 induces a natural rotation of the egg, i.e. backspin, about its natural axis of about 90 degrees. Since the egg is naturally eccentric, the backspin turns the egg 28 so that the larger, more rounded or bottom end 28b of the egg leads as the egg falls off the rollers 26 onto an egg carrier mechanism 34 associated with the second conveying mechanism 18b. The contact with the wall accelerates the motion of the egg 28. For example, the bottom end 28b falls first vertically off the rollers, as shown at 48. The major axis 42 of the egg 28 is perpendicular to the forward motion of the first conveying mechanism 18a as the egg leaves the first conveying mechanism 18a, and the egg 28 now has a predetermined orientation as it falls into the egg carrier mechanism 34 associated with the second conveying mechanism 18b so that the bottom of the egg initially contacts the second conveying mechanism 18b. In this example, the egg carrier mechanism is a gripper 35 having fingers. All eggs 28 will be mechanically turned to have the same orientation, such as 90 degrees with the tip end up. Since the egg orientation is now known, the egg carrier mechanism 34 or gripper 35 of this example can be manipulated as necessary, i.e. as shown at 50. Advantageously, the eggs are all oriented without the need for any type of sensing mechanism. As a result, the eggs can move at a high rate of speed, such as 6 eggs per second.

It is contemplated that the egg orientation mechanism 24 may include either or both of the lifter mechanism 26 and the sidewall 32, depending on the needs of the egg handling machine 10.

Thus, in operation of the egg orientation mechanism 24 of this example, the eggs 28 have been initially accumulated, such as at an egg accumulation station 11. The eggs 28 may be funneled into defined rows, and move in a forwardly direction using the first conveying mechanism 18a, such as via rollers 26. At this point, the eggs 28 do not have a predetermined orientation with respect to each other. However, if the eggs are moving along rollers 26, the tip end 28a of the egg 28 tends to migrate outwardly, i.e. towards the frame 12. As the egg 28 moves along the rollers 26, eggs 28 move across the lifter mechanism 36 and the egg 28 is lifted slightly by actuation of the lifter mechanism 36. The elevation of the egg causes the egg 28 to contact the sidewall 32, which creates a drag on the egg resulting in the egg 28 becoming unbalanced and rotating about its major axis up to 90 degrees. The major axis of the egg is now perpendicular to the earlier, forward motion of the egg, and each egg 28 has the same orientation. In this example, the larger, rounded egg end 28b is now leading. The egg is released into an egg carrier mechanism 34 associated with the second conveying mechanism 18b, which may be positioned to catch the egg 28 below the first conveying mechanism 18a. For example, the egg may be released onto a second egg carrier mechanism 34, such as grippers, brushes, rollers, a carrier, receiver or the like associated with the second egg conveying mechanism 18b. The egg 28 may now be carried to the next station using the second conveying mechanism 18b. Advantageously, the eggs 28 now have a predetermined orientation.

Figure 4:
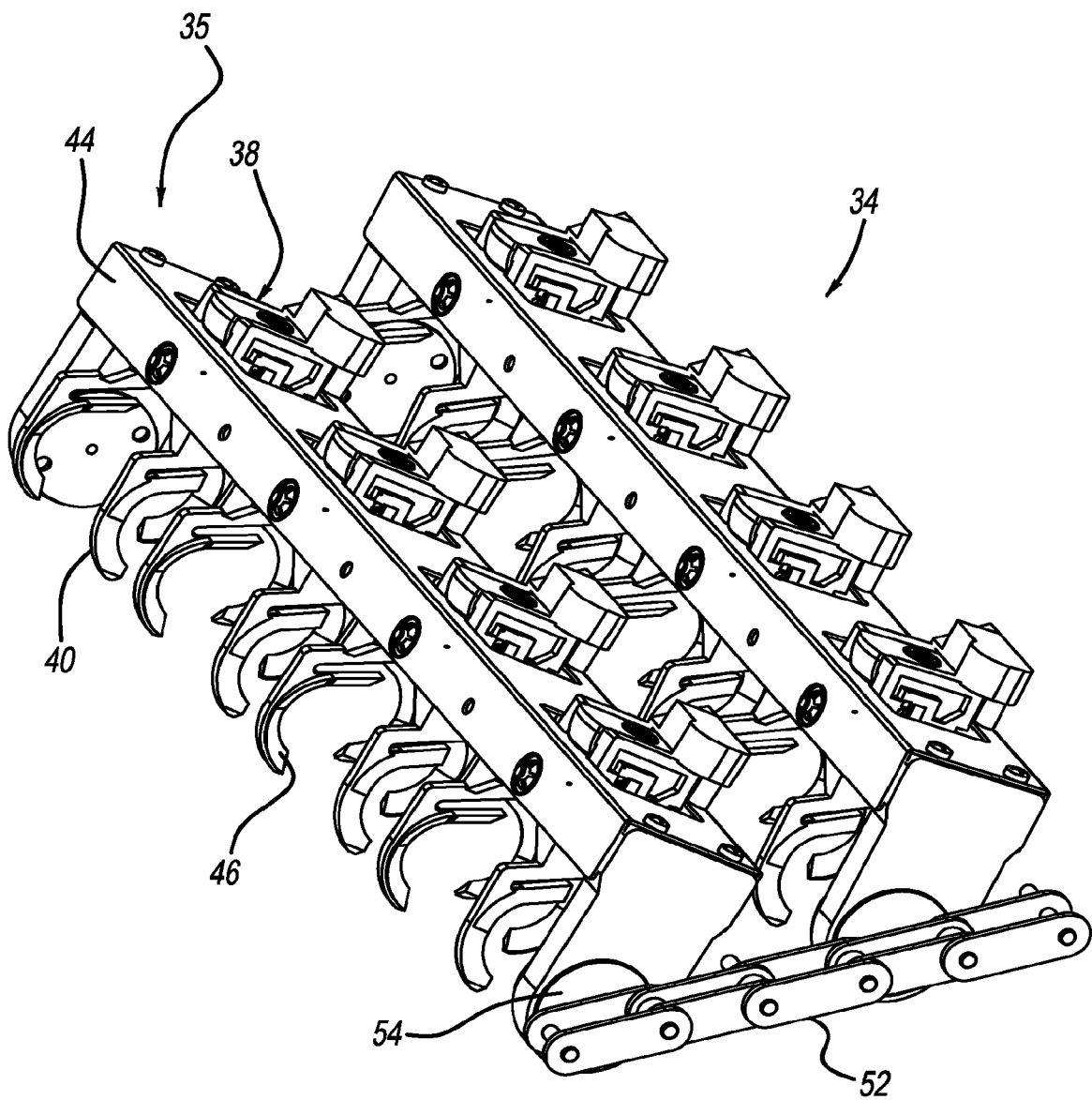
FIG. 4 is a perspective view of an egg carrier for use in the egg handling machine of FIG. 1.
Figure 5:
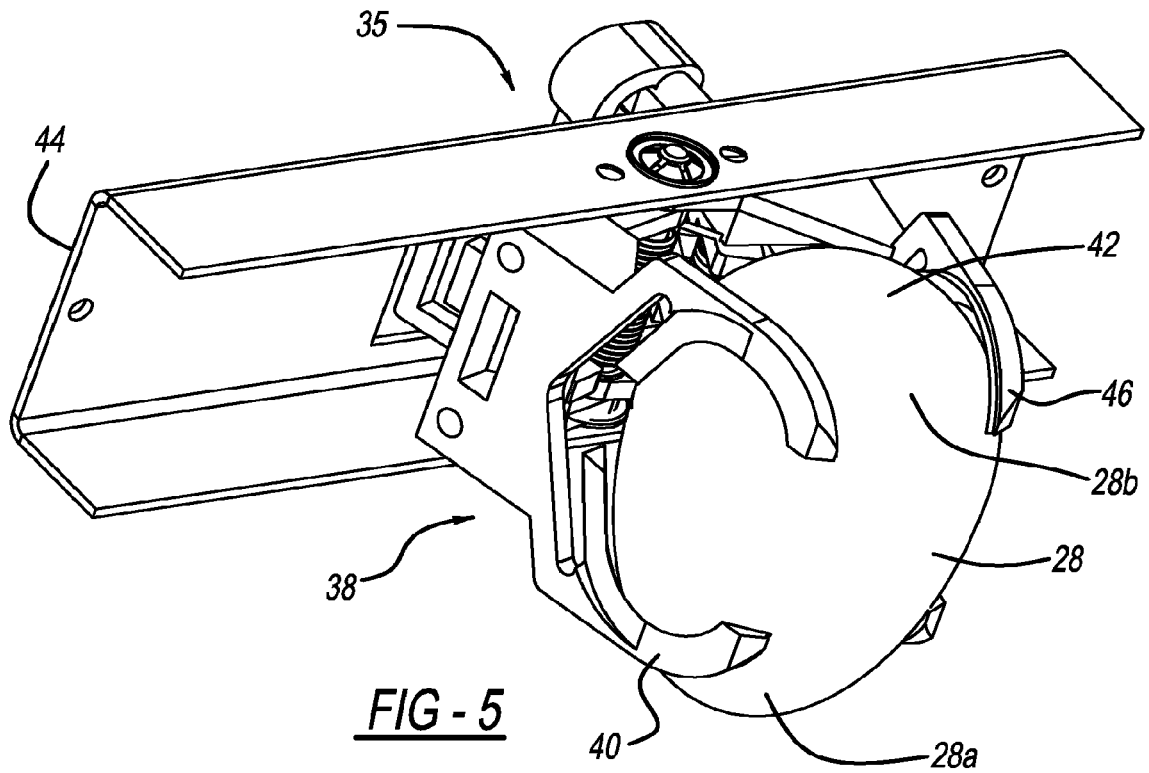
FIG. 5 is an enlarged rear view of the egg carrier of FIG. 4.
Figure 6:
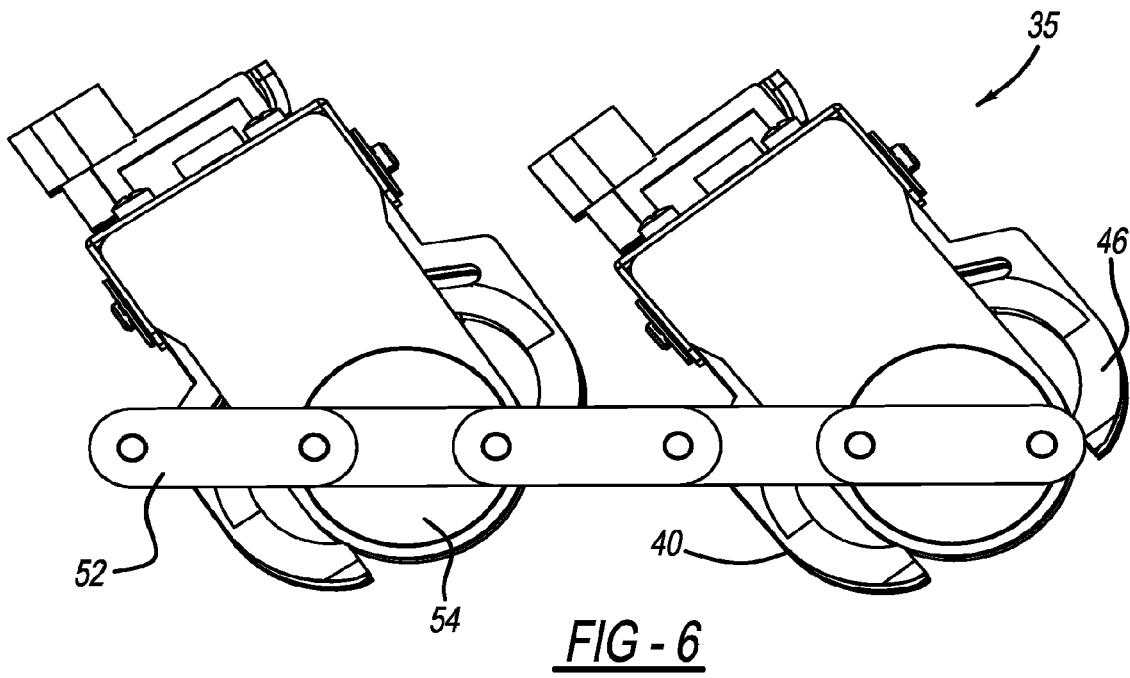
FIG. 6 is an enlarged side view of the egg carrier of FIG. 4.

Referring to FIGS. 4-6, an egg carrier mechanism 34 which is a gripper egg carrier mechanism 35 is illustrated. The gripper egg carrier mechanism 35 may be used to catch the egg 28 after the egg has been oriented using the egg orientation mechanism 24. Further, the gripper egg carrier mechanism 35 may be used with the improved method of releasing an egg, to be described. The gripper egg carrier mechanism 35 may be utilized within any of the stations 11. By way of example, the gripper egg carrier 35 is shown after the eggs have been oriented using the egg orientation mechanism 24. In an example, the gripper egg carrier mechanism 35 includes a plurality of individual egg holders 38 that catch the egg and impedes further momentum of the egg. A plurality of egg holders 38 are in spaced relation to each other. The number of egg holders 38 corresponds to the number of rows of eggs. For example, the gripper egg carrier mechanism 35 includes a cross member 44 and a pair of egg grippers 40 are mounted to the cross member corresponding to the number of rows of eggs. Each egg gripper 40 include a pair of opposed gripper fingers 46 that are pivotally secured to the cross member 44 at an upper end of the gripper finger 46. The gripper fingers 46 can engage an egg in various orientations, such as horizontal or vertical. In this example, the egg tip 28a is pointed downwardly so that the rounded egg end 28b is held in a more positive manner, although other positions are contemplated.

The cross member 44 may be pivotally attached to a drive member 52 such as a chain drive 52 via a connecting member or cam 54. The pivotal attachment of the cross member 44 may provide for the pivotal movement of the egg holder 38 in a manner to be described to vary the release angle of the egg. By way of example, coupled at the end of each cam member is an extension bar which is spaced from the end cam member by an integral spacer. A bar may be provided with an upper T-shaped portion which is engageable with the latch pins of a comb assembly and solenoid actuated plunger to cause rotational movement of the cross member 44 in a manner to be described.

The egg may be carried through each of the various stations using the egg holder 38 or grippers 40 of this example. Advantageously, the eggs 28 have a predetermined orientation, which in this example is with the egg tip 28a pointed downwardly so that the rounded egg end 28b is held by the gripper fingers 46 in a more positive manner. Other orientations are contemplated, and the gripper egg carrier mechanism 35 may be manipulated accordingly.

Figure 7:
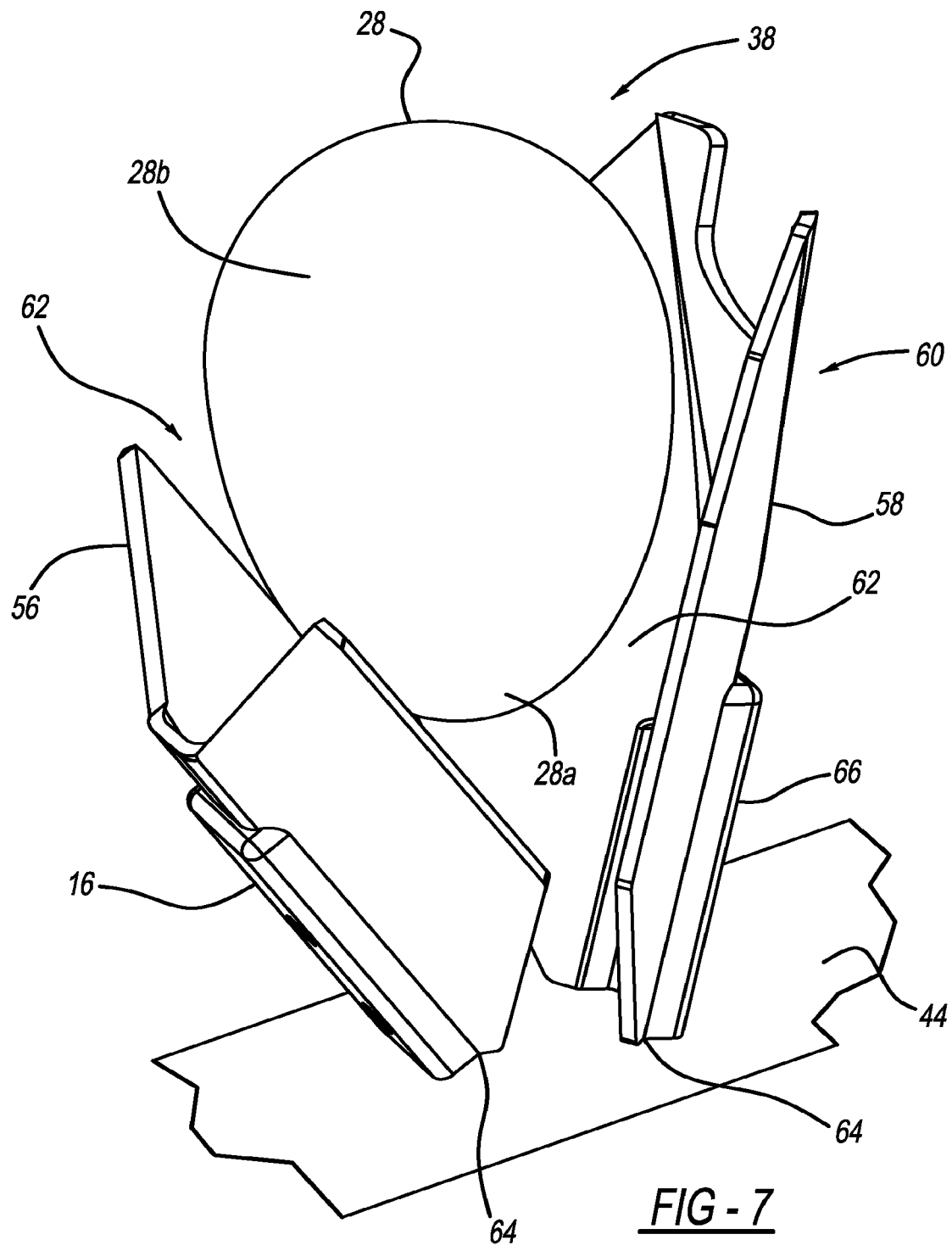
FIG. 7 is a perspective view of a clam-shell egg holder for use with the egg handling machine of FIG. 1.
Figure 8:
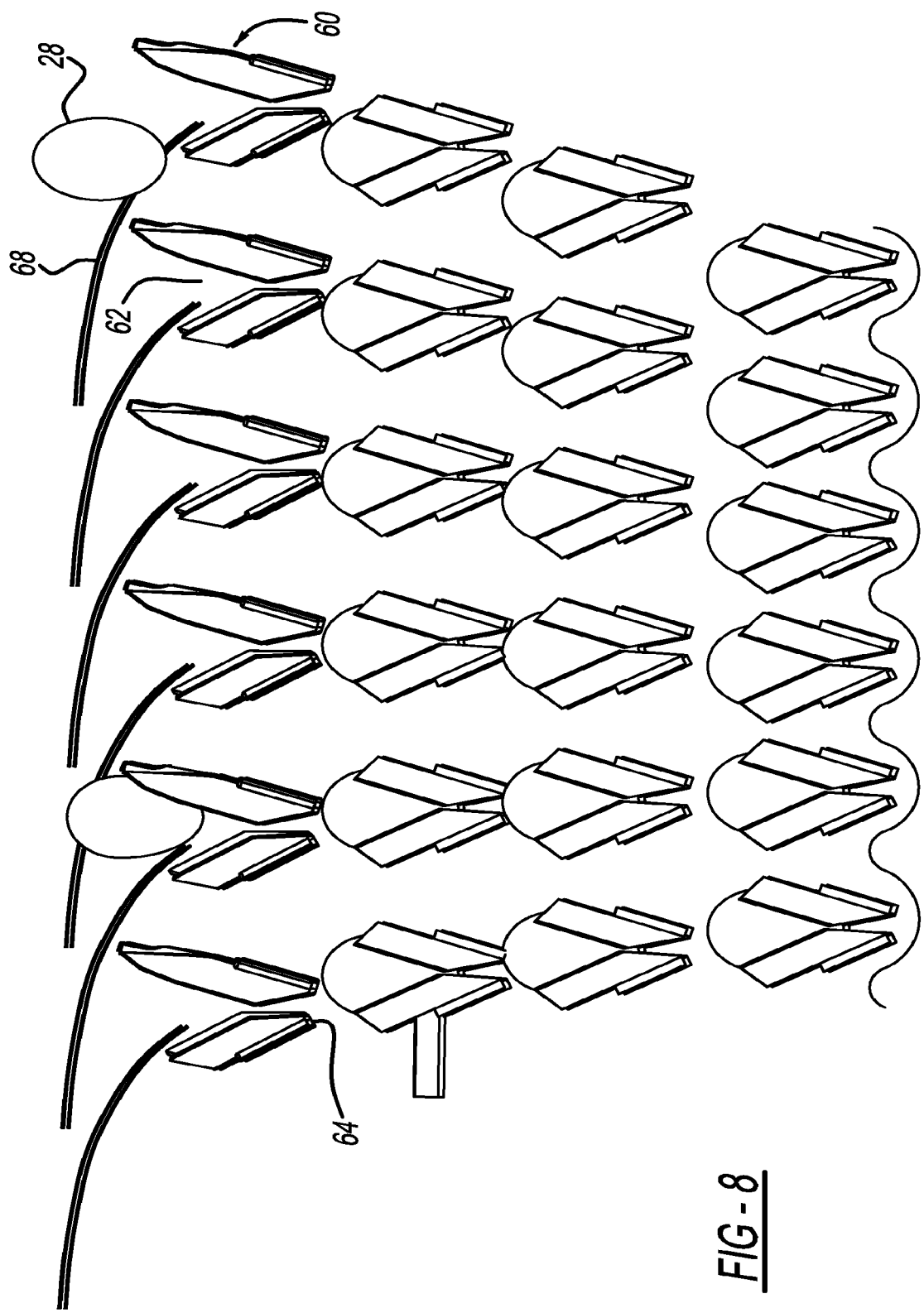
FIG. 8 is a perspective view illustrating motion of the egg into the clam-shell carrier.

Referring to FIGS. 7-8, another example of an egg carrier mechanism 34 which has an improved clam-shell type egg holder is illustrated. The clamshell receiver 60 receives and supports the egg 28 while transporting the egg through the predetermined station and may be utilized within any of the stations 11. By way of example, the clamshell receiver 60 is shown carrying the eggs into the packaging station. The clamshell receiver 60 is secured to a cross-member 44, and such attachment may be stationary or pivotal in a manner to be described. The clamshell receiver 60 includes a front wall 56 and a rear wall 58. The front wall 56 may be shorter than the rear wall 58 by a predetermined amount so as to receive the egg 28. An egg-receiving portion 62 is formed in the space between the front wall 56 and rear wall 58. Each of the front wall 56 and rear wall 58 have a predetermined shape, to better accommodate the egg 28. In this example, the front wall 56 and rear wall 58 each have a "V" shape, although other linear, curved or curvilinear shapes are contemplated to create a "soft" target for the egg to distribute impact forces of the egg contacting the rear wall 58. The walls 56, 58 may be formed of one member, or multiple members. It is contemplated that each of the front wall and rear wall may be flexible strips. Further the walls 56, 58 may be formed from a suitable material having some elasticity, i.e. a plastic, such as Delran, or polyurethane or the like. The material is selectively determined to preclude fracture of the egg. The clamshell receiver 60 can receive the egg 28 in any orientation. In an example, the egg 28 is received in a vertical orientation with the tip 28a facing downwardly in a manner to be described, i.e. the major axis of the egg is perpendicular to the direction of travel of the conveying mechanism.

In the example of a clam-shell egg carrier, a lower edge of each of the front wall 56 and the rear wall 58 are pivotally connected to the cross member 44 at a first pivot point 64 that is located below a center line of the egg receiving portion 62. In a further example, the first pivot point 64 is located at the lowermost edge of the front wall 56 and rear wall 58. Pivotal movement of each of the front wall 56 and rear wall 58 is controlled by the respective pivot mechanism (not shown) associated with either the front wall 56 or rear wall 58. It is contemplated that either the front wall 56 or rear wall 58 may pivot independently or both walls may pivot concurrently about the first pivot point. For example, the front wall 56 may pivot outwardly or away from the rear wall to receive the egg. In another example, each of the front wall 56 and rear wall 58 may pivot outwardly or away from each other. The walls move together to grip, cradle or otherwise hold the egg 28. Similarly, one or both of the walls 56, 58 may pivot outwardly to release the egg 28, such as into another egg carrier 34 associated with a conveying mechanism 18 in another station. For example, the egg may be released into another clamshell receiver 60.

In another example, either one or both of the front wall 56 and rear wall 58 may have a second pivot point as shown at 66 that is located above the centerline of the egg receiving portion 62. The second pivot point 66 would facilitate release of the egg by pivotal movement of the upper portion of the front wall 56 or rear wall 58 in an outwardly direction.

In operation, the front and/or rear wall pivot about a first pivot point 64 located below a centerline of the egg receiving portion 62 of the clamshell receiver. As the egg 28 is released into the clamshell receiver 60, the egg first hits the rear wall 58, and then slides downwardly along the rear wall 58 into the egg-receiving portion 62 of the clamshell receiver. Advantageously, the line speed of the conveying mechanism 18 may be increased since the eggs are caught in a more positive manner.

Figure 9:
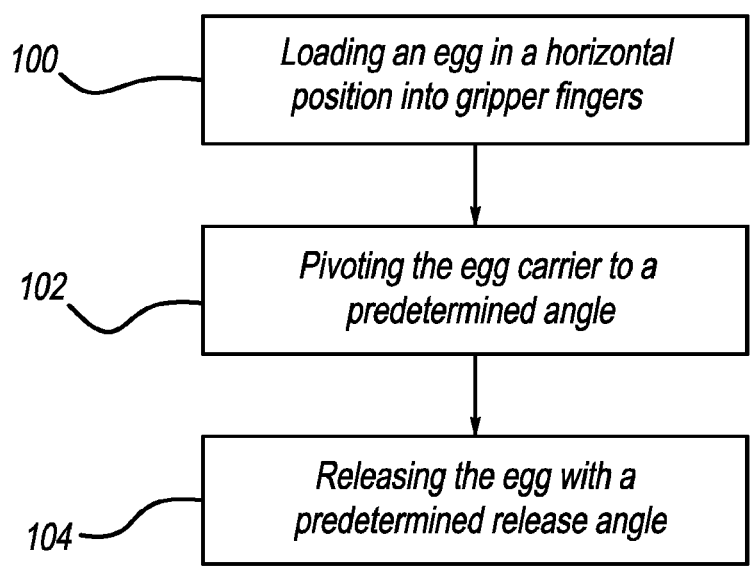
FIG. 9 is a flowchart of a method of releasing eggs into an egg holder for use with the egg handling machine of FIG. 1.

Referring to FIG. 9, a method of releasing an egg into the egg carrier mechanism 34 is illustrated. The methodology begins at 100 with the step of providing an egg 28 having a predetermined orientation in an egg carrier mechanism 34. In this example, the egg carrier mechanism 34 is a gripper egg carrier mechanism 35. The egg is held by the gripper fingers 46 with a horizontal orientation in this example, although other orientations are contemplated. The methodology advances to block 102 and includes the step of pivoting the egg carrier mechanism 35 or egg holder 38, i.e. grippers 40 of this example, a predetermined amount. As shown in FIGS. 4-6, the egg holder cross member 44 is pivoted forwardly or rearwardly to a predetermined angle, such as 45 degrees, so that the angle of the major axis 42 of the egg with respect to the direction of motion changes. As a result of pivoting the egg carrier mechanism 34, the egg 28 is released at a predetermined release angle with respect to the table top 14 that is less than or greater than 90 degrees, but not 90 degrees. The method advances to block 104 and includes the step of releasing the egg. The trajectory of the egg is skewed due to the angular release of the egg 28 as shown in FIG. 8 at 68. The egg 28 may be released into another egg carrier mechanism 34 and associated egg holder 38 in a controlled manner, such as into a clam shell receiver, cup or brush or the like. Advantageously, the skewed release trajectory allows for more efficient transfer of the egg between different egg holders. In this example the egg is released with the egg tip pointed downwardly, although other orientations are contemplated.

In an example, the egg holders 38 or grippers 40 of this example, are arranged to have a 4-inch spacing between gripper fingers 46, so as to release eggs at a high rate of speed into another egg holder 38 i.e. clamshell receivers 60, having a 3-inch spacing. Multiple rows of the clamshell receivers 60 may be positioned in multiple configurations so as to sequentially catch the eggs. If the eggs are released into a clamshell receiver 60, the egg first hits the rear wall, and then slides downwardly into the egg-receiving portion 62 of the clamshell receiver. Advantageously, the line speed of the conveying mechanism may be increased since the eggs are caught in a more positive manner.

The present disclosure has been described in an illustrative manner. It is to be understood that the terminology which has been used is intended to be in the nature of words of description rather than of limitation. Many modifications and variations of the present example are possible in light of the above teachings. Therefore, within the scope of the appended claims, the present disclosure may be practices other than as specifically described.

What is claimed is:

1. An egg carrier for handling eggs comprising:
a drive member,
a support member, said support member pivotally connected to said drive member;
a gripper connected to said support, said gripper including a pair of opposed gripper fingers; and
an actuator, said actuator attached to said support member and operative to rotate the support member;
said drive member includes a first chain and a second chain; and
said support member includes a cross member extending between said first chain and said second chain, said cross member pivotally connected to each of said first chain and said second chain.

2. The egg carrier of claim 1 including a cam member pivotally connecting at least one of said first chain and said second chain to said support member.

3. The egg carrier of claim 1 including a solenoid actuated plunger engaging said cam member and operative to rotate the cross member.

4. An egg transfer mechanism comprising:
a carrier, said carrier having a direction of travel; a gripper attached to said carrier;
an actuator, said actuator operative to move said gripper between a transport position and a release position;
said transport position having an orientation such that a major axis of an egg is contained in a plane containing the direction of travel; and
said release position having an orientation of the major axis of said egg different from that of said transport position and contained in said plane containing the direction of travel, wherein the major axis of the egg is not perpendicular or parallel to the direction of travel when in the release position.

5. The egg transfer mechanism of claim 4 wherein said gripper includes a pair of opposed gripper members for engaging the egg.

6. The egg transfer mechanism of claim 4 including a cross member, said gripper attached to said cross member; and
said actuator connected to and operative to move said cross member.

7. The egg transfer mechanism of claim 6 wherein said actuator includes a solenoid actuated plunger.

8. The egg transfer mechanism of claim 7 wherein said carrier includes a drive member;
a cross member pivotally attached to said drive member; and
a plurality of grippers attached to said cross member, wherein pivotal movement of said cross member moves said grippers between said transport position and said release position.

9. The egg transfer mechanism of claim 8 including a cam pivotally attaching said cross member to said drive member.

10. A method of releasing an egg from an egg carrier in a machine for handling eggs comprising the steps of:
holding an egg using a first egg holder associated with a first egg conveying mechanism, wherein the egg has a first predetermined orientation of 180 degrees with respect to a frame supporting the egg first conveying mechanism;
rotating the first egg holder so that the egg has a second predetermined orientation with respect to the frame; and
releasing the egg at an angle that is greater than 180 degrees or less than 180 degrees with respect to the frame into a second egg holder associated with a second egg conveying mechanism.

11. The method of claim 10 wherein the released egg has a skewed trajectory as received by the second egg holder to increase line speed of the first and second conveying mechanism.

12. The method of claim 10 wherein the first egg holder is a gripper mounted to a cross member, and the cross member rotates to vary the orientation of the egg.

13. The method of claim 10 wherein the second egg holder is a clamshell receiver having:
a front wall with an upper end and a lower end, and the front wall has a predetermined height; and
a rear wall having an upper end and a lower end, wherein the rear wall has a predetermined height and an egg receiving space is formed between the front wall and the rear wall and either one of the front wall or rear wall is pivotal about a pivot point that is located below a centerline of the egg receiving space to increase the egg receiving space when catching the egg and decreasing the egg receiving space when holding the egg.

14. A method of transferring an egg in a machine for handling eggs comprising the steps of:
providing an egg carrier, the egg carrier having a direction of carrier travel;
using the egg carrier to hold and move the egg in a transport position wherein a major axis of the egg is either perpendicular or parallel to the direction of carrier travel; and
repositioning the egg carrier from the transport position to a release position wherein the major axis of the egg is not perpendicular or parallel to the direction of carrier travel.

15. The method of claim 14 wherein the major axis of the egg is contained in a same plane containing the direction of carrier travel.

16. The method of claim 14 including a gripper, said gripper including a plurality of a gripper fingers; and
changing the orientation of the gripper to reposition the egg carrier from the transport position to the release position.

17. The method of claim 14 wherein the egg carrier is associated with a first egg conveying mechanism, the first egg conveying mechanism transferring the eggs in the first transport position to a second egg conveying mechanism;
repositioning the egg carrier from the transport position to the release position; and
releasing the egg from the egg carrier and correspondingly the first egg conveying mechanism into a second egg holder associated with the second egg conveying mechanism.

18. The method of claim 17 wherein the released egg has a skewed trajectory as received by the second egg holder to increase the line speed of the first and second conveying mechanism.

19. The method of claim 17 wherein the egg carrier is repositioned to a predetermined angle such that the angle of the major axis of the egg with respect to the direction of carrier travel changes.

20. The method of claim 19 wherein the major axis of the egg and the direction of carrier travel are contained in the same plane.

* * * * *